Nov. 1, 1949     H. C. BECKER     2,486,911
TRACTION GRIP PLATE
Filed May 26, 1948
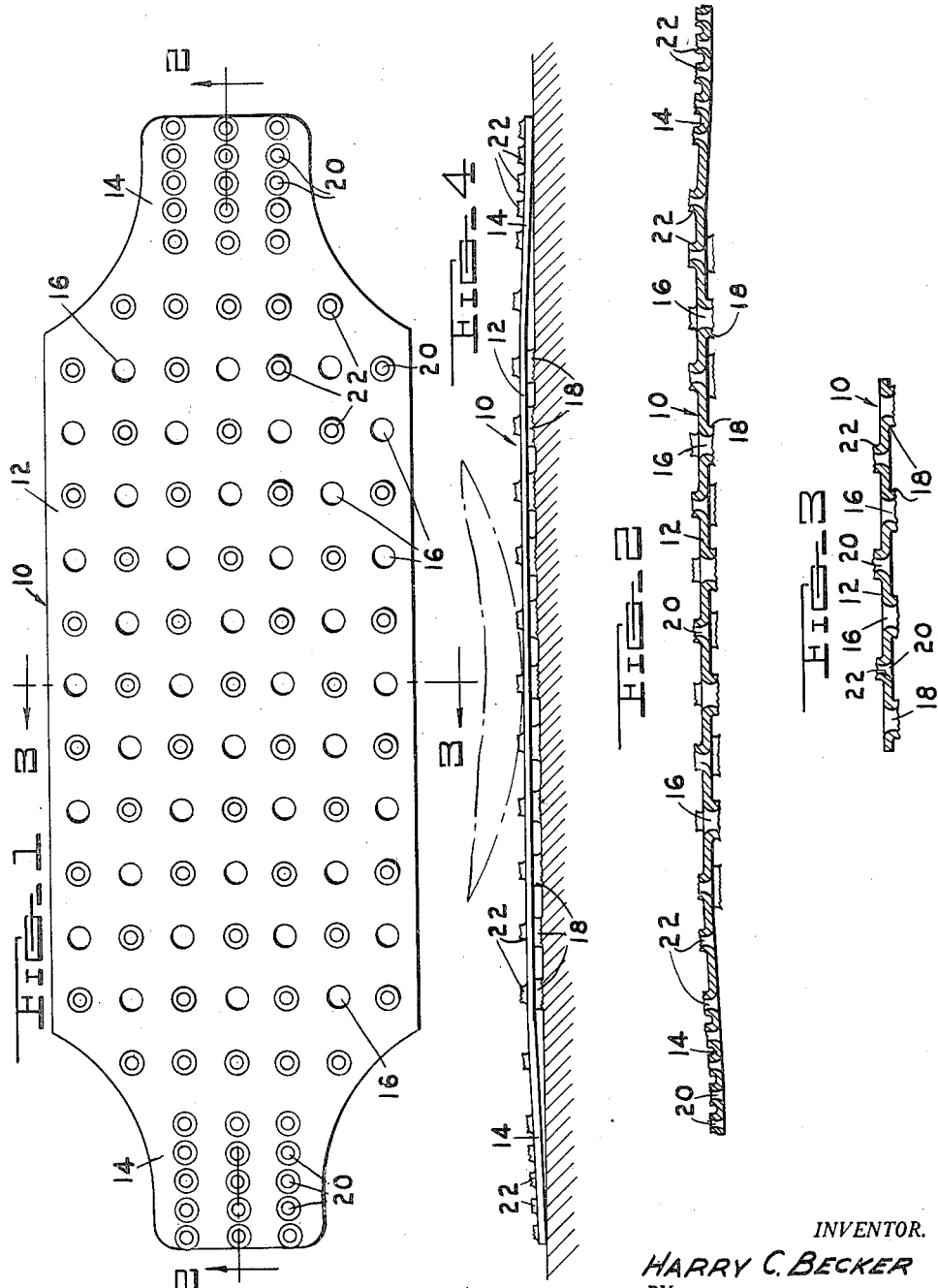
INVENTOR.
HARRY C. BECKER
BY
Burton & Parker
ATTORNEYS Patented Nov. 1, 1949

2,486,911

UNITED STATES PATENT OFFICE 2,486,911

TRACTION GRIP PLATE

Harry C. Becker, Detroit, Mich.

Application May 26, 1948, Serial No. 29,339

2 Claims. (Cl. 238—14)

This invention relates to an improved traction grip plate.

An object is to provide a traction grip plate adapted for use to be placed under a vehicle wheel to enable the wheel to obtain traction on the road so as to move the vehicle.

Considerable difficulty is encountered at certain times of the year in moving a car away from the curb due to ice and snow on the pavement. This traction grip plate is so constructed that when it is placed on the pavement with one end projecting underneath the wheel, the wheel will grip the plate so as to travel thereover and the plate will grip the pavement so that it will not slide thereover and the car will move forwardly.

An object of my invention is to provide a traction grip plate which is inexpensive, of simple construction, and which may be easily carried within vehicle and is easy to use.

Another object is to provide a traction grip plate which is so constructed that the movement of the wheel onto the end of the plate is facilitated.

A meritorious feature of the invention is that the traction grip plate herein disclosed is so constructed that it may be formed of a single piece of sheet metal, and this metal sheet is punched so as to provide protuberances projecting upwardly therefrom to afford a good traction surface for the road wheel of the vehicle and is also provided with other protuberances projecting downwardly therefrom and adapted to engage the road surface so as to prevent skidding of the plate thereover.

Another meritorious feature is that the plate is so shaped and so constructed that not only will it afford suitable traction for a vehicle wheel to travel thereover and not only will it grip the pavement so securely as not to skid thereover, but both end portions are so disposed with respect to the main body portion of the plate as to facilitate movement of the road wheel thereonto.

More specifically the end portions are bent slightly downwards out of the plane of the central portion of the plate so that either end portion can be readily slid underneath a tire to facilitate the wheel rolling up on to the plate. The plate also may be used as a support for a jack to hold the jack securely in position against slippage.

Other objects, advantages and meritorious features will more fully appear from the following description, claims and accompanying drawings, wherein:

Fig. 1 is a plan of a traction grip plate embodying my invention.

Fig. 2 is a longitudinal sectional view taken on the line 2—2 of Fig. 1.

Fig. 3 is a transverse sectional view taken on the line 3—3 of Fig. 1.

Fig. 4 is a side elevation of the plate shown in Figs. 1, 2 and 3.

The traction grip plate illustrated is one that is adapted to be employed primarily to obtain traction on a slippery pavement for a driving road wheel of a motor vehicle. When an automobile is parked adjacent to the curb and the pavement is slippery, it is frequently difficult to get away from the curb because of the slipping of the driving road wheels. A traction grip plate, such as is herein described, may be readily carried in an automobile and it is easy to place the same on the pavement using one end of the plate inserted underneath the wheel so that the wheel can obtain traction thereon. The plate is so formed as to provide good traction for the wheel and also the plate is so formed as to secure a good grip on the pavement.

In the drawings, the traction grip plate is indicated generally by the numeral 10. It comprises a body portion 12 disposed between opposite end portions 14. The body portion 12 has a greater width than the end portions as will appear from Fig. 1. This plate may be formed of suitable sheet material, such as a sheet of resilient steel.

The body portion of the plate is provided with a plurality of apertures 16 punched therethrough from the upper surface of the plate. As the metal is punched out, it forms a plurality of protuberances or tongue-like projections 18 which extend downwardly below the lower surface of the plate and are bent slightly outwardly radially from the center of the aperture 16 as shown particularly in Fig. 3. These tongues are jagged and sharp pointed on the ends and tend to dig into the pavement and hold the plate securely thereto against skidding.

This main body portion 12 of the plate is provided with another series of openings punched therethrough and indicated by numeral 20. These openings are punched from the bottom side of the plate and form protuberances or tongues 22 which project upwardly above the upper surface of the plate. These tongues 22 are adapted to provide a good traction grip for the tire.

It will be seen that the openings 16 are of substantially greater size in diameter than the openings 20 and that the tongues 22 have a length substantially less than the projecting length of the tongues 18.

From Fig. 2, it is apparent that the opposite end portions 14 of the plate are bent slightly downwards so that the extreme margin of each end portion lies in a plane which is substantially flush with the lower ends of the protuberances 18. When the plate is placed flat on the pavement, the end portion 14 which is inserted underneath the wheel will, therefore, have its margin resting snugly against the pavement so as to facilitate the movement of the tire onto the plate.

What I claim is:

1. An automobile traction grip plate comprising, in combination, an elongate plate including a main body portion between two end portions, said main body portion having a plurality of openings punched therethrough providing tongues projecting downwardly below the lower surface of the plate and having a plurality of other openings punched therethrough providing tongues projecting upwardly above the upper surface of the plate, said two end portions each having a plurality of groups of openings punched therethrough, each of said groups consisting of a plurality of said openings longitudinally spaced from one another, each opening providing a tongue projecting upwardly above the upper surface of the plate but having no tongues projecting therefrom downwardly below the under surface.

2. A traction grip plate of the character defined in claim 1 characterized in that the end portions of the plate are bent downwardly with respect to the plane of the body portion of the plate.

HARRY C. BECKER.

REFERENCES CITED

The following references are of record in the file of this patent:

UNITED STATES PATENTS

| Number | Name | Date |
| --- | --- | --- |
| 1,339,612 | Wilkins | May 11, 1920 |
| 1,500,249 | McCracken et al. | July 8, 1924 |
| 1,594,623 | Lundberg | Aug. 3, 1926 |
| 1,863,316 | Webster | June 14, 1932 |
| 1,970,781 | Stevens et al. | Aug. 21, 1934 |
| 2,058,192 | Turulis | Oct. 20, 1936 |
| 2,250,280 | Starbird | July 22, 1941 |